United States Patent
Borrenpohl et al.

(10) Patent No.: US 7,478,646 B2
(45) Date of Patent: Jan. 20, 2009

(54) VALVE OUTLET ENCLOSURE DEVICE

(76) Inventors: Terry Borrenpohl, 3790 Sugar Lake Dr., Freeburg, IL (US) 62243; Wayne L. Borrenpohl, 225 E. Elm St., Venedy, IL (US) 62214

( * ) Notice: Subject to any disclaimer, the term of this patent is extended or adjusted under 35 U.S.C. 154(b) by 583 days.

(21) Appl. No.: 11/224,530

(22) Filed: Sep. 12, 2005

(65) Prior Publication Data

US 2006/0005881 A1    Jan. 12, 2006

Related U.S. Application Data

(63) Continuation-in-part of application No. 10/768,240, filed on Jan. 30, 2004, now abandoned.

(60) Provisional application No. 60/443,993, filed on Jan. 31, 2003.

(51) Int. Cl.
*F16K 35/00* (2006.01)
(52) U.S. Cl. .................. 137/382; 137/383; 137/377; 70/177
(58) Field of Classification Search .............. 137/377, 137/382, 383, 382.5; 70/175, 176, 177, 178, 70/180, 232; 285/45
See application file for complete search history.

(56) References Cited

U.S. PATENT DOCUMENTS

| | | | |
|---|---|---|---|
| 122,396 A | | 1/1872 | McIlhenny |
| 1,084,996 A * | | 1/1914 | Wright .................. 70/178 |
| 2,048,424 A * | | 7/1936 | Caldwell .................. 70/232 |
| 2,727,526 A | | 12/1955 | Nickle |
| 3,245,240 A | | 4/1966 | DeForrest |
| 4,208,893 A * | | 6/1980 | Avrich et al. .................. 70/178 |
| 4,254,888 A * | | 3/1981 | Chandler .................. 220/694 |
| 4,352,370 A * | | 10/1982 | Childress .................. 137/382 |
| 4,377,245 A * | | 3/1983 | Patty .................. 220/822 |
| 4,405,161 A | | 9/1983 | Young et al. |
| 4,457,445 A * | | 7/1984 | Hanks et al. .................. 220/214 |
| 4,538,728 A | | 9/1985 | Lewis |
| 4,541,256 A * | | 9/1985 | Green .................. 70/232 |
| 4,678,003 A * | | 7/1987 | Griffin .................. 137/382 |
| 4,781,044 A * | | 11/1988 | Ortega .................. 70/177 |
| 4,903,719 A * | | 2/1990 | Rains .................. 137/15.17 |
| 5,033,280 A * | | 7/1991 | Johnson .................. 70/232 |
| 5,078,171 A * | | 1/1992 | Moore et al. .............. 137/15.08 |
| 5,092,359 A * | | 3/1992 | Wirth et al. .................. 137/382 |
| 5,102,020 A | | 4/1992 | Walker |

(Continued)

OTHER PUBLICATIONS

Web page http://www.tanksalok.com/endorsments.html (pp. 1 and 2) printed Jan. 16, 2004.

(Continued)

*Primary Examiner*—John Rivell
*Assistant Examiner*—Cloud K Lee
(74) *Attorney, Agent, or Firm*—Polster Lieder Woodruff & Lucchesi, LC

(57) ABSTRACT

The present invention is an enclosure device for attachment to a fluid withdrawal valve on a chemical storage tank to prevent unauthorized access. The enclosure device comprises a first and second housing pivotally attached with a hinge to pivot between an open and closed position. In addition, the first and second housing define a cavity for receiving the fluid withdrawal valve. In the closed position, a fastener locks the enclosure device to prevent unauthorized access.

9 Claims, 4 Drawing Sheets

U.S. PATENT DOCUMENTS

| | | | |
|---|---|---|---|
| 5,104,372 A | | 4/1992 | Rossetto |
| 5,152,313 A | | 10/1992 | Chapman |
| 5,238,141 A | * | 8/1993 | Callegari et al. ............ 220/725 |
| 5,560,235 A | | 10/1996 | Aucoin |
| 5,590,682 A | | 1/1997 | Fischer |
| 5,803,968 A | | 9/1998 | Schwartz et al. |
| 5,806,555 A | | 9/1998 | Magno, Jr. |
| 5,927,313 A | | 7/1999 | Hart |
| 6,106,025 A | * | 8/2000 | Kang ........................... 285/45 |
| 6,123,098 A | | 9/2000 | Gremillion, III |
| 6,145,534 A | * | 11/2000 | Romero ...................... 137/382 |
| 6,206,033 B1 | * | 3/2001 | Chang ........................ 137/551 |
| 6,209,365 B1 | | 4/2001 | Neeley |
| 6,311,734 B1 | * | 11/2001 | Petrovic .................... 138/110 |
| 6,332,555 B1 | | 12/2001 | Stangier |
| 6,371,155 B1 | * | 4/2002 | Balocca ..................... 137/377 |
| 6,382,001 B1 | | 5/2002 | Neeley et al. |
| 6,439,010 B1 | | 8/2002 | Julicher |
| 6,692,045 B1 | * | 2/2004 | Mc Call, Jr. ................ 292/281 |
| 6,840,556 B1 | | 1/2005 | Catlett |
| 2003/0234043 A1 | * | 12/2003 | Miller ........................ 137/382 |
| 2004/0159133 A1 | * | 8/2004 | Marcelle et al. ............... 70/164 |

OTHER PUBLICATIONS

Cover and one page from Gas Equipment Co., Inc. catalog (undated) showing "Lock Cap for Fill Valve".

USPTO Communication Mail Dated May 5, 2006; U.S. Appl. No. 10/768,240.

USPTO Communication Mail Dated Oct. 2, 2006; U.S. Appl. No. 10/768,240.

USPTO Communication Mail Dated Feb. 16, 2007; U.S. Appl. No. 10/768,240.

USPTO Communication Mail Dated May 29, 2007; U.S. Appl. No. 10/768,240.

USPTO Communication Mail Dated Aug. 20, 2007; U.S. Appl. No. 10/768,240.

USPTO Communication Mail Dated Nov. 8, 2007; U.S. Appl. No. 10/768,240.

USPTO Communication Mail Dated Jun. 12, 2008; U.S. Appl. No. 10/768,240.

* cited by examiner

VALVE OUTLET ENCLOSURE DEVICE

CROSS-REFERENCE TO RELATED APPLICATIONS

This application is a continuation-in-part of U.S. patent application Ser. No. 10/768,240 filed Jan. 30, 2004, now abandoned hereby incorporated by reference, which claims the benefit of provisional application No. 60/443,993 filed Jan. 31, 2003.

STATEMENT REGARDING FEDERALLY SPONSORED RESEARCH

Not applicable.

BACKGROUND OF THE INVENTION

This invention relates to bulk storage tanks and more specifically, to safety devices to prevent unauthorized access to, and withdrawal of product from, a bulk chemical tank, such as an anhydrous ammonia nurse tank.

In recent years the illegal production of methamphetamine has become a major problem in the United States. Anhydrous ammonia is an ingredient in the manufacture of illegal methamphetamine. The United States government also has identified Anhydrous ammonia as a compound that terrorists might utilize for attacks on this country.

Anhydrous ammonia is used legitimately in agriculture as a source of nitrogen, a plant nutrient, for example in the production of grain and forage crops throughout the world. Anhydrous ammonia generally is transported and stored as a pressurized liquid. Most commonly, in agricultural use, anhydrous ammonia is transported to farm fields in nurse tanks. Various sprayers, hoses, or the like are attached to a liquid withdrawal valve to allow withdrawal or application of the product. Between uses, these tanks typically are stored at the chemical supplier's location or on the farm or in the fields. In recent years there has been a significant rise in tampering with the nurse tanks and theft of the anhydrous ammonia for use in production of illegal methamphetamine. Generally, the thief gains access to the liquid withdrawal valve and removes the liquid anhydrous ammonia from the tank.

It would beneficial, therefore, to have an apparatus that prevents the unauthorized access to the nurse tank valve and the subsequent removal of anhydrous ammonia for illegal purposes.

SUMMARY OF THE INVENTION

The present invention is directed to a device that prevents access to a chemical storage tank withdrawal valve and the unauthorized removal of chemical from the tank through the valve.

Briefly stated, the invention comprises a first housing and a second housing. The second housing is hingedly attached to the first housing. When in an opposed relationship, the first housing and second housing define a cavity and an opening into the cavity for receiving and enclosing a discharge element of a withdrawal valve. This prevents unauthorized access to and removal of material from the valve.

The foregoing and other features, and advantages of the invention as well as embodiments thereof will become more apparent from the reading of the following description in connection with the accompanying drawings.

DESCRIPTION OF THE DRAWINGS

In the accompanying drawings which form part of the specification.

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
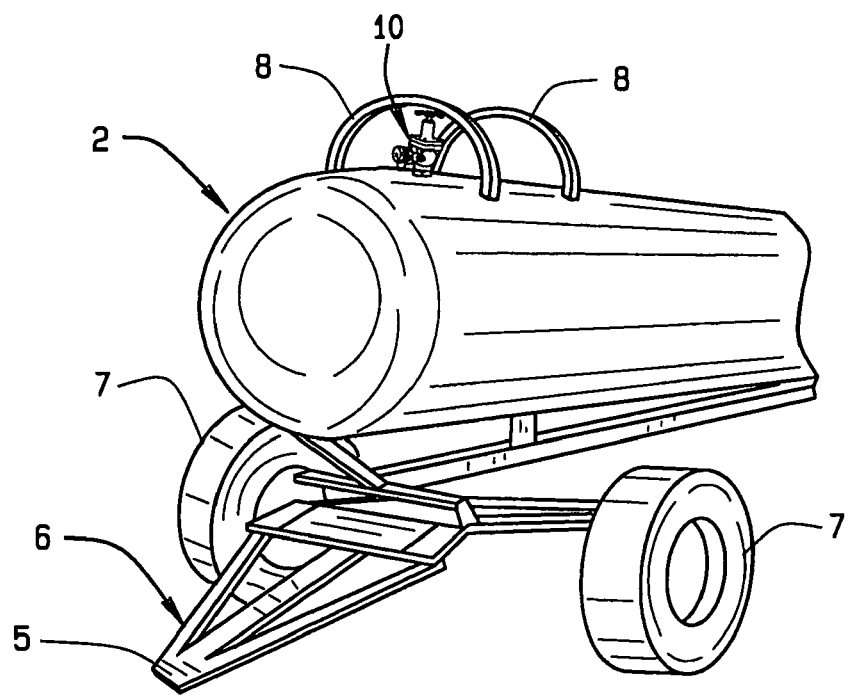
FIG. 1 is a perspective view of an anhydrous ammonia nurse tank.

The present invention is an enclosure device 1 designed to prevent unauthorized access to, and withdrawal of material from, a bulk chemical storage tank 2, as indicated generally in FIG. 1. Tank 2, of the type shown in FIG. 1, is generally referred to as a nurse tank used primarily in agriculture to store or transport anhydrous ammonia. Tank 2 includes a generally cylindrical, hollow container 3, on a chassis 4 having a tongue 5, hitch 6 and wheels 7 to impart mobility to the nurse tank. Those skilled in the art will recognize that the present invention can be used with any tank, stationary or mobile, of any useful configuration.

Figure 2:
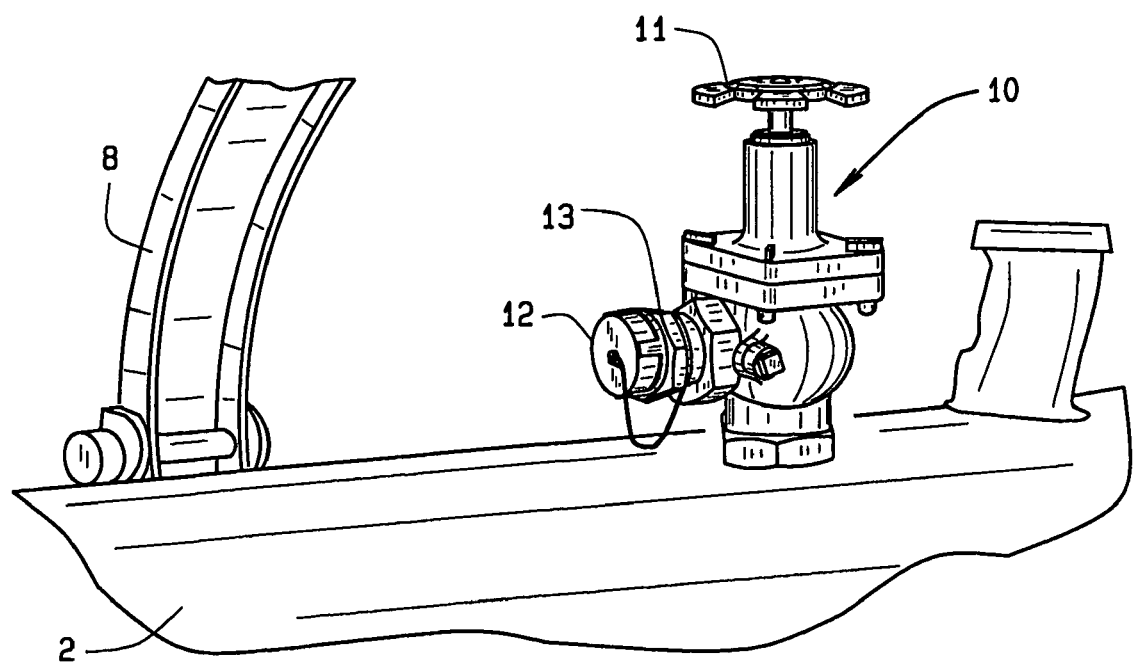
FIG. 2 is a perspective view of a liquid withdrawal valve for an anhydrous ammonia nurse tank.
Figure 3:
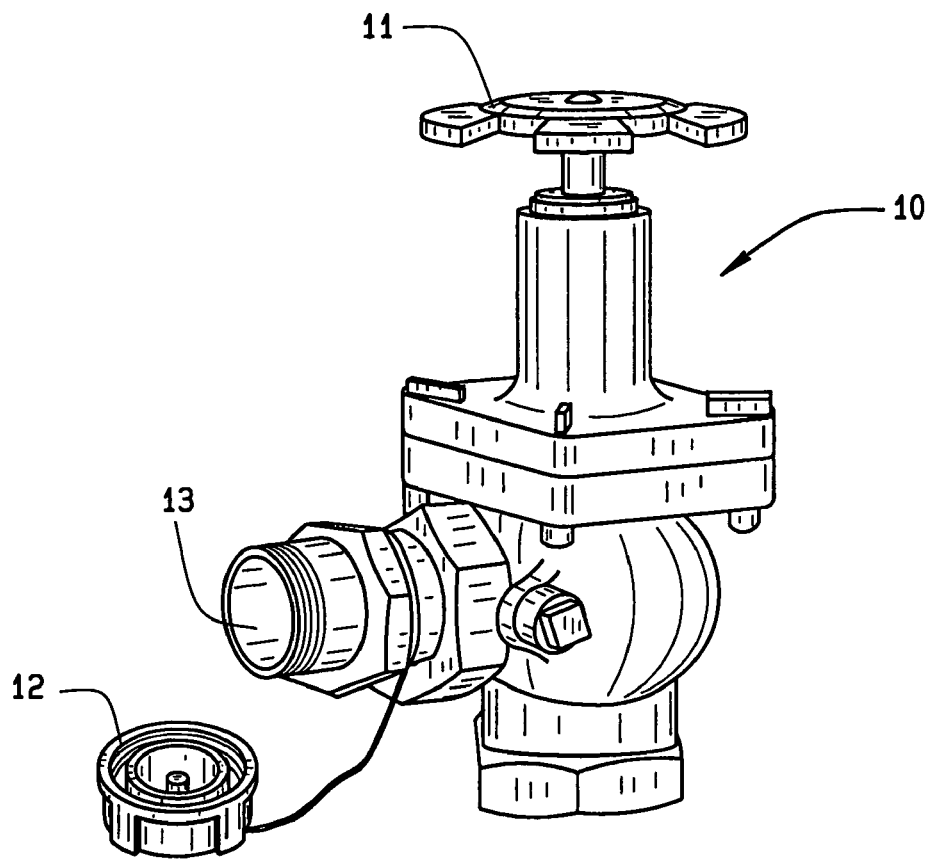
FIG. 3 is a perspective view of the liquid withdrawal valve for an anhydrous ammonia nurse tank with cap removed.

As seen in detail in FIG. 2, tank 2 has a liquid withdrawal valve 10, in the illustrated embodiment shown on an upper surface. Often, roll bars 8 are attached to the tank 2 to prevent damage to the valve 10 in the event the tank 2 rolls over. The liquid withdrawal valve 10 communicates fluids into and out of the tank 2. As shown in FIG. 3, the valve includes a handle 11 which an operator engages to open and close the valve. In addition, a cap 12 secures to a discharge element 13 of the valve to prevent leakage or unintended output of fluids. With the cap 12 secured, fluid cannot exit the valve even with the handle 11 in an open position.

To access fluids in the tank 2, an operator removes the cap 12 and couples a hose to the discharge element 13 of the valve 10. Then, the operator turns the handle 11 to the on position and either inputs or outputs fluids through the hose. When finished, the operator turns the handle 11 to the off position, disconnects the hose, and replaces the cap 12. It is in this position that the enclosure device 1 engages the valve 10 to prevent unauthorized access.

Figure 4:
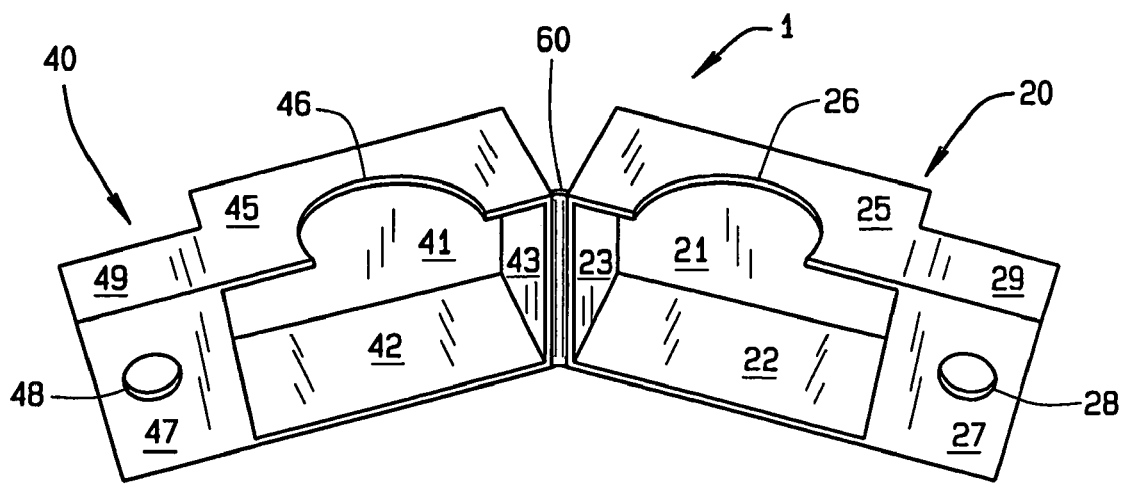
FIG. 4 is a perspective view of a first embodiment of a valve outlet enclosure of the present invention.
Figure 5:
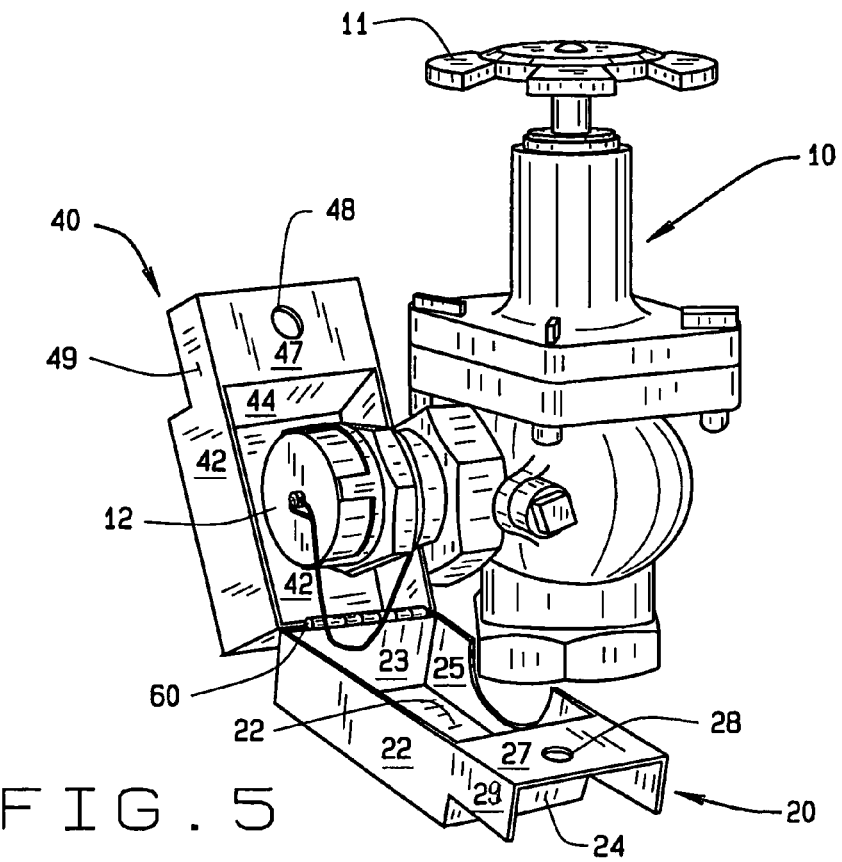
FIG. 5 is a perspective view of the first embodiment of the valve outlet enclosure positioned at a liquid withdrawal valve prior to attachment.
Figure 6:
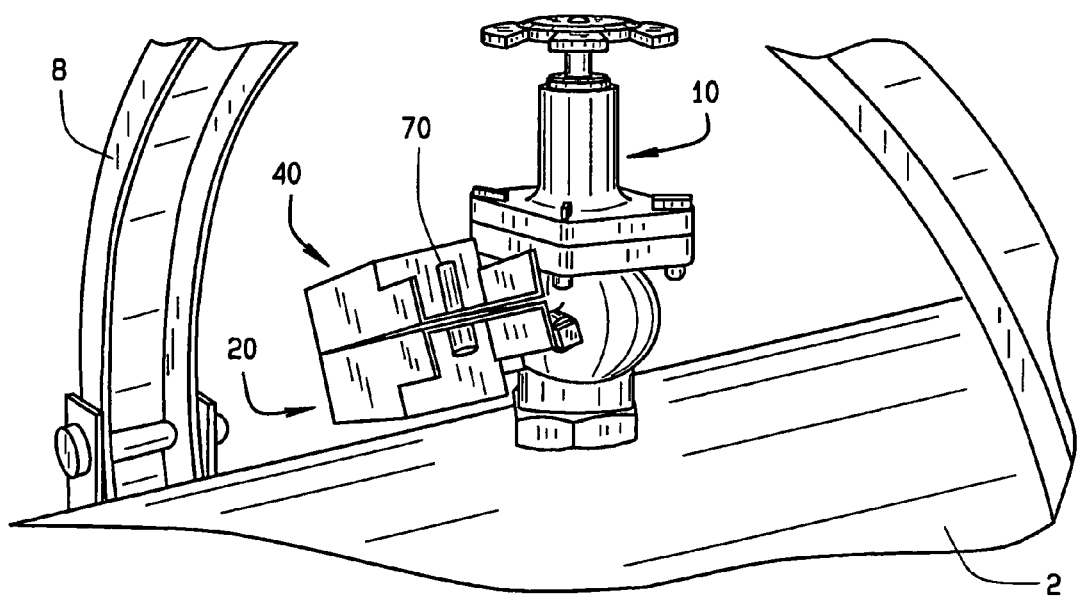
FIG. 6 is a perspective view of the first embodiment of the valve outlet enclosure attached to the liquid withdrawal valve.

As shown in FIGS. 4-6, the first embodiment of the enclosure device 1 comprises a first housing 20 and a second housing 40 hingedly connected by a hinge 60 and locked with a fastener 70. The first housing 20 is a rectangular box which includes a first face 21, a first housing side 22, a first hinge side 23, a first flange side 24, a first engagement side 25, and a first flange 27. The first face 21 is a rectangular plate with a circumferential edge. The first housing side 22 is a rectangular plate which extends perpendicularly from the circumferential edge of the first face 21. The first hinge side 23 is a rectangular plate which extends perpendicularly from the circumferential edge of the first face 21 and adjoins the first housing side 22. The first flange side 24 is a rectangular plate which extends perpendicularly from the circumferential edge of the first face 21 opposite the first hinge side 23 and adjoins the first housing side 22. The first engagement side 25 is a rectangular plate defining a concave first recess 26. The first engagement side 25 extends perpendicularly from the circumferential edge of the first face 21 opposite the first housing side 22 and adjoins the first hinge side 23 and the first flange side 24 so the first recess 26 will mate with a second recess 43 to be described below. The first flange 27 is a rectangular plate which extends perpendicularly from a lower edge of the first flange side 24 defining a first opening 28. The first flange also includes a pair of first protective edges 29 which extend perpendicularly from the first flange.

The second housing 40 is a rectangular box which mirrors the first housing 20. Therefore, second housing 40 includes a second face 41, a second housing side 42, a second hinge side 43, a second flange side 44, a second engagement side 45, and a second flange 47. The second face 41 is a rectangular plate with a circumferential edge. The second housing side 42 is a rectangular plate which extends perpendicularly from the circumferential edge of the second face 41. The second hinge side 43 is a rectangular plate which extends perpendicularly from the circumferential edge of the second face 41 and adjoins the second housing side 42. The second flange side 44 is a rectangular plate which extends perpendicularly from the circumferential edge of the second face 41 opposite the second hinge side 43 and adjoins the second housing side 42. The second engagement side 45 is a rectangular plate defining a concave second recess 46. The second engagement side 45 extends perpendicularly from the circumferential edge of the second face 41 opposite the second housing side 42 and adjoins the second hinge side 43 and the second flange side 44 so the second recess 46 will mate with the first recess 26 described above. The second flange 47 is a rectangular plate which extends perpendicularly from a lower edge of the second flange side 44 defining a second opening 48. The first flange also includes a pair of second protective edges 49 which extend perpendicularly from the second flange 47.

Those of skill in the art will recognize that the first and second housing 20 and 40 can be formed of either separate pieces attached together by welding or other means or one solid piece. In addition, the first and second housing 20 and 40 could be made from any suitable material, such as metal or polymers. Also, the first and second housings can be constructed in a configuration other than rectangular without departing from the scope of the invention.

The first housing 20 and second housing 40 are pivotally attached with a hinge 60 at the first hinge side 23 and second hinge side 43 so they can pivot from an open position to a closed position. In the open position shown in FIG. 5, the first and second housing 20 and 40 are in an opposed relationship defining a cavity and an opening into the cavity for receiving and enclosing the discharge element 13 of the valve 10. More specifically, the first recess 26 fits around the valve 10 so the discharge element 13 resides within the cavity. In the closed position shown in FIG. 6, the first and second housing 20 and 40 mate so the first and second recess 26 and 46 align and the first and second flanges 27 and 47 are positioned so the openings 28 and 48 align. More specifically, the first and second recess 26 and 46 fit around the valve 10 so the discharge element 13 resides within the cavity.

When the enclosure device 1 is in the closed position, a fastener 70 is inserted into the first and second openings 28 and 48 to secure the first housing 20 to the second housing 40. This prevents unauthorized access to the valve. The fastener 70 can be any suitable fastening device, such as a lock. The lock can be a cylindrical lock, pad lock, combination lock, or any other secure fastening device.

Figure 7:
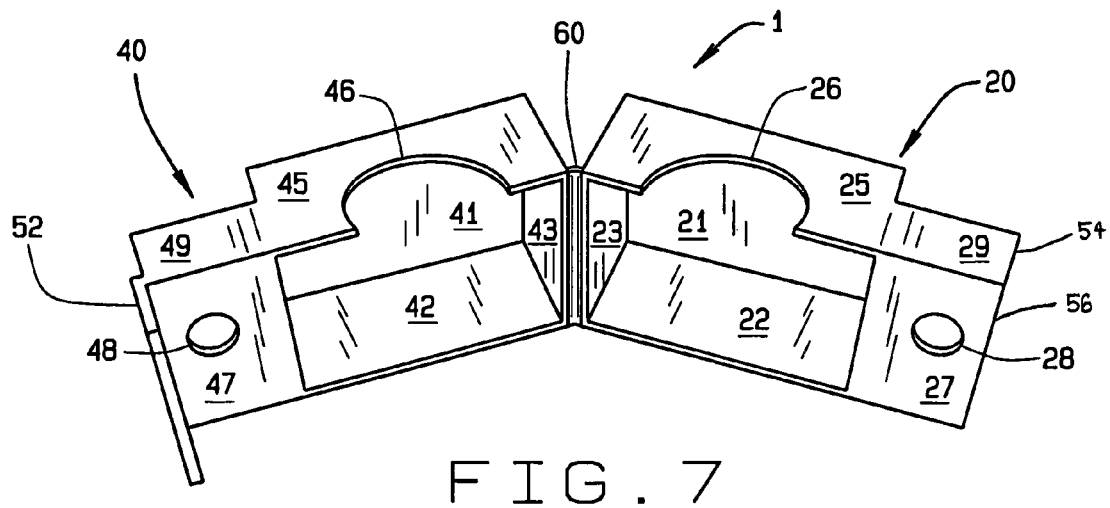
FIG. 7 is a perspective view of a second embodiment of the valve outlet enclosure having a guard member of the present invention.
Figure 8:
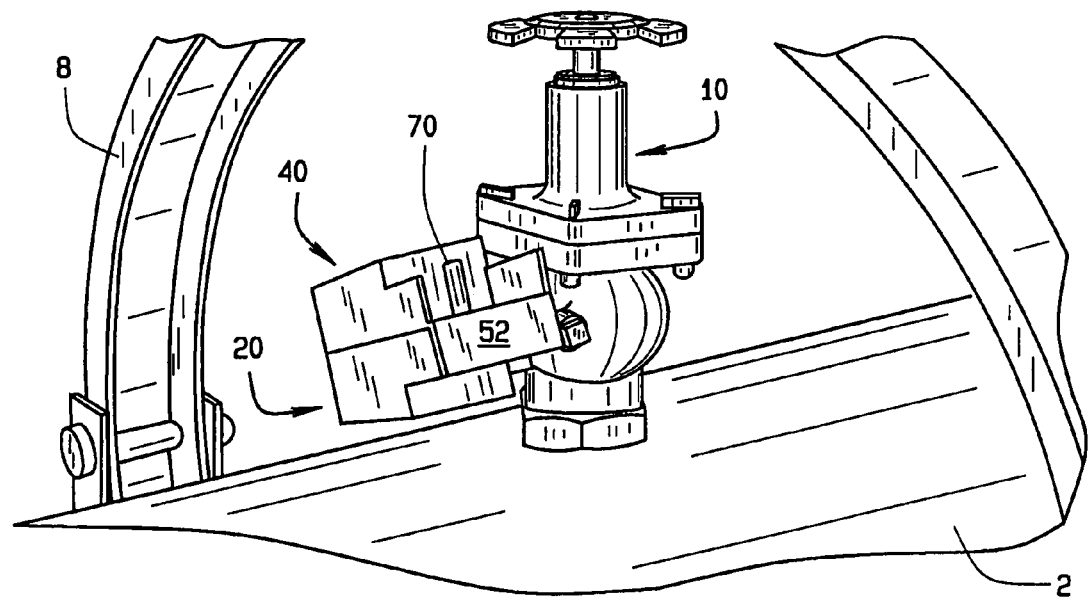
FIG. 8 is a perspective view of the second embodiment of the valve outlet enclosure having a guard member and being attached to the liquid withdrawal valve.

The present invention can also be embodied in the form of the second embodiment shown in FIGS. 7 and 8. The second embodiment of the enclosure device 1 is similar to the first embodiment except for the addition of a guard member 52.

The guard member 52 extends perpendicularly from the second flange 47 in a direction opposite of the second protective edges 49. When the enclosure 1 is in the closed position, the guard member 52 abuts the ends 54 of the first protective edges 29 and the end 56 of the first flange 27. In this way, the guard member obstructs transverse access to the fastener 70, which prevents the fastener 70 from being removed or damaged by cutting tools or other implements.

Other embodiments can have the guard member positioned in various other positions. For example, the guard member can extend perpendicularly from the second flange 47 in the same direction of the second protective edges 49 so the guard member abuts the ends 58 of the second protective edges 49. In addition, a second guard member (not shown) can extend perpendicularly from the first flange 27 in the same direction of the first protective edges 29 so the guard member abuts the ends 58 of the first protective edges 29.

Changes can be made in the above constructions without departing from the scope of the invention, it is intended that all matter contained in the above description or shown in the accompanying drawings shall be interpreted as illustrative and not in a limiting sense.

The invention claimed is:

1. An apparatus for attachment to a valve, comprising:
a first housing and a second housing hingedly attached to the first housing, the first and second housings, when in an opposed relationship defining a cavity and an opening into the cavity for receiving and enclosing a discharge element of the valve to prevent unauthorized access to and removal of material from the valve;
a fastener for securing the first housing and the second housing in a closed position to revent unauthorized withdrawal of chemical through the valve and
at least one guard member to limit access to the fastener;
a first flange having an opening therein on the first housing and a second flange having an opening therein on the second housing, the first and second flanges positioned so as to align the recited openings when the first and second housings are in an opposed relationship so as to allow the fastener to be introduced through the recited flanges to fasten the first housing to the second housing;
at least one protective edge extending from the first flange; and
wherein at least one guard member extends generally perpendicular from the second flange and abuts the at least one protective edge of the first flange to obstruct transverse access to the fastener.

2. The apparatus of claim 1 wherein the fastener comprises a lock.

3. The apparatus of claim 1, wherein at least one guard member extends generally perpendicular from the second flange to obstruct transverse access to the fastener.

4. An apparatus for attachment to a valve comprising:
a first housing and a second housing hingedly attached to the first housing, the first and second housings when in an opposed relationship defining a cavity and an opening into the cavity for receiving and enclosing a discharge element of the valve to prevent unauthorized access to and removal of material from the valve:
a fastener for securing the first housing and the second housing in a closed position to prevent unauthorized withdrawal of chemical through the valve; and
at least one guard member to limit access to the fastener;
a first flange having an opening therein on the first housing and a second flange having an opening therein on the second housing, the first and second flanges positioned so as to align the recited openings when the first and second housings are in an opposed relationship so as to allow the fastener to be introduced through the recited flanges to fasten the first housing to the second housing;
at least one protective edge extending from the second flange; and
wherein at least one guard member extends generally perpendicular from the second flange and abuts the at least one protective edge of the second flange to obstruct transverse access to the fastener.

5. The apparatus of claim 4 wherein the fastener comprises a lock.

6. The apparatus of claim 4 wherein at least one guard member extends generally perpendicular from the second flange to obstruct transverse access to the fastener.

7. An apparatus for attachment to a fluid withdrawal valve on a chemical storage tank, comprising:
a first housing having a first face, a first housing side extending from an circumferential edge of the first face, a first hinge side extending from the circumferential edge of the first face and adjoining the first housing side, a first flange side extending from the circumferential edge of the first face opposite the first hinge side and adjoining the first housing side, a first engagement side extending from the circumferential edge of the first face opposite the housing side and adjoining the first hinge side and the first flange side and defining a concave first recess;
a first flange extending perpendicularly from an edge of the first flange side having a first opening and first protective edges extending perpendicularly from the first flange;
a second housing having a second face, a second housing side extending from an circumferential edge of the second face, a second hinge side extending from the circumferential edge of the second face and adjoining the second housing side, a second flange side extending from the circumferential edge of the second face opposite the second hinge side and adjoining the second housing side, a second engagement side extending from the circumferential edge of the second face opposite the housing side and adjoining the second hinge side and the second flange side and defining a concave second recess;
a second flange extending perpendicularly from an edge of the second flange side having a second opening and second protective edges extending perpendicularly from the second flange;
a hinge connecting the first hinge side to the second hinge side so the first housing and second housing can pivot from an open position to a closed position; and
a fastener inserted into the first opening and second opening to fasten the first housing to the second housing to prevent unauthorized withdrawal of chemical through the valve;
at least one guard member extending generally perpendicular from the second flange and abutting the first protective edges to obstruct transverse access to the fastener.

8. The apparatus of claim 7 wherein the fastener comprises a cylindrical lock.

9. An apparatus for attachment to a fluid withdrawal valve on a chemical storage tank, comprising:
a first housing having a first face, a first housing side extending from an circumferential edge of the first face, a first hinge side extending from the circumferential edge of the first face and adjoining the first housing side, a first flange side extending from the circumferential edge of the first face opposite the first hinge side and adjoining the first housing side, a first engagement side extending from the circumferential edge of the first face opposite the housing side and adjoining the first hinge side and the first flange side with means for engaging the valve;
a first flange extending perpendicularly from an edge of the first flange side having a first opening and first protective edges extending perpendicularly from the first flange;
a second housing having a second face, a second housing side extending from an circumferential edge of the second face, a second hinge side extending from the circumferential edge of the second face and adjoining the second housing side, a second flange side extending from the circumferential edge of the second face opposite the second hinge side and adjoining the second housing side, a second engagement side extending from the circumferential edge of the second face opposite the housing side and adjoining the second hinge side and the second flange side with means for engaging the valve;
a second flange extending perpendicularly from an edge of the second flange side having a second opening and second protective edges extending perpendicularly from the second flange;
a means for hingedly attaching the first hinge side to the second hinge side; and a means for fastening the first flange to the second flange to prevent withdrawal of chemical through the valve;
at least one guard member extending generally perpendicular from the second flange to obstruct transverse access to the means for fastening.

* * * * *